United States Patent [19]
Ganz

[11] 4,057,800
[45] Nov. 8, 1977

[54] MULTI-PRF SIGNAL PROCESSOR SYSTEM

[75] Inventor: Frederick M. Ganz, Head-of-the-River, Smithtown, N.Y.

[73] Assignee: Grumman Aerospace Corporation, Bethpage, N.Y.

[21] Appl. No.: 691,884

[22] Filed: June 1, 1976

[51] Int. Cl.$^2$ .............................................. G01S 9/44
[52] U.S. Cl. ................................. 343/8; 343/17.1 PF
[58] Field of Search ............................. 343/8, 17.1 PF

[56] References Cited

U.S. PATENT DOCUMENTS

| | | | |
|---|---|---|---|
| 3,603,999 | 9/1971 | Palleiko | 343/17.1 PF |
| 3,706,990 | 12/1972 | Carre | 343/17.1 PF X |
| 3,787,848 | 1/1974 | Laundry et al. | 343/17.1 PF X |
| 3,858,208 | 12/1974 | Parke et al. | 343/17.1 PF X |
| 3,902,174 | 8/1975 | Siegel | 343/17.1 PF X |

*Primary Examiner*—T.H. Tubbesing

[57] ABSTRACT

A multi PRF doppler radar processor system for airborne target search radar preferably using five PRF's. The received signal is processed through a bank of doppler filters, and the filter number and PRF of every target indication in a single range band is memorized. When indications have been made at two different PRF's, the first and second data sets are processed. The first data set is used to determine a doppler band shift value, $\Delta f$, required to bring the center of a velocity band, $A_1$, to the center of the filter band, and this same $\Delta f$ is applied to the second data set, from which the corresponding velocity band, $A_2$ is determined. The velocity bands $A_1$ and $A_2$ are converted by use of the Chinese Ramainder Theorem to an unambiguous velocity band $Au$. The original frequency shift $\Delta f$ is applied to the center frequency of $Au$ to determine the unambiguous doppler frequency of the target.

11 Claims, 6 Drawing Figures

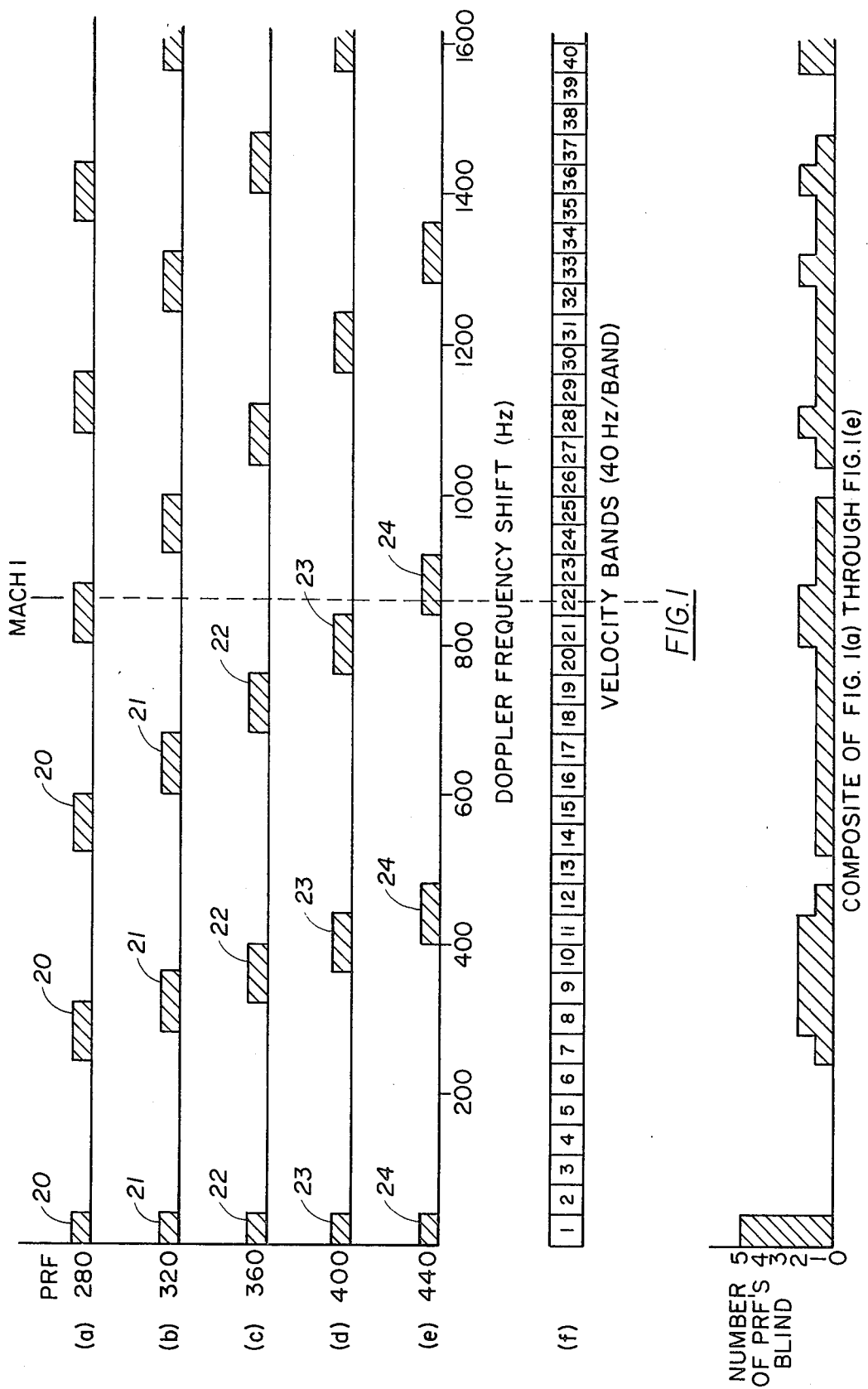

MULTI-PRF SIGNAL PROCESSOR SYSTEM

FIELD OF THE INVENTION

The present invention relates to doppler radar systems and has particular reference to multiple pulse repetition frequency processor systems for use in air target search radars.

BACKGROUND

It is well known that in pulse doppler radar, the choice of low PRF (pulse repetition frequency) yields an unambiguous range capability and a relaxed dynamic range requirement, but results in blind speeds, and velocity ambiguities. Existing radars tend to live with the blind speeds, and generally rely on scan-to-scan range changes in order to measure target velocity. In a radar designed so that rapid PRF changes can be effected, some of the disadvantages of low PRF operation can be eliminated. In defining appropriate PRF's and subsequent processing, one would strive for a processor architecture which has the capability to (1) eliminate blind speeds, (2) accurately measure target radial velocity and resolve velocity ambiguities, and (3) effect non-coherent integration gain using the individual PRF outputs. The multiple PRF processor system described herein not only offers these capabilities, but additionally provides other performance benefits which are both interesting and important.

A basic PRF chosen to provide a predetermined unambiguous range coverage in airborne target search has associated with it blind speeds that repeat at the basic PRF interval. At UHF, a PRF of 320 Hz, for example, corresponds to a velocity of 218 kts. Assuming that the blind speeds due to Moving Target Indication (MTI) processing are 80 Hz or 25% wide, this results in 55 kt blind speeds that repeat at 218 kt intervals.

SUMMARY OF THE INVENTION

In the present invention, a multiple PRF processor system acts in conjunction with multiple PRF's that are transmitted at a single antenna dwell position. In order to obtain complete velocity coverage between ± Mach 3 a minimum of 3 PRF's are required. The proposed radar/processor waveform, however, uses 5 PRF's to provide more than one clear PRF for any target velocity. The PRF's are chosen in the preferred ratio of 7, 8, 9, 10, and 11 with respect to each other, for reasons that will be made clear later, and have nominal values of 280, 320, 360, 400, and 440 Hz. The blind speed locations associated with each of the five PRF's individually are such that a minimum of three PRF's are clear for any target doppler frequency of interest (except near Mach 3) and on the average, four are clear.

At very long ranges, fewer PRF's may be available for detection processing. It is important to note, however, that blind speeds diminish at these ranges, particularly in over water operation, with the result that the remaining PRF's are completely clear.

In the preferred processor system, basic coherent integration at each PRF is performed using a Fast Fourier Transform (FFT) processor. Associated with the FFT output is a threshold which in effect forms the clutter rejection notch by having a very high setting for the doppler filters that contain mainlobe clutter. The outputs from the threshold detectors are applied to a coincidence gate, which yields a tentative target report at a single PRF.

The determination of the doppler frequency at any PRF is subject to the well known phenomenon of spectral foldover wherein a plurality of output peaks occur over the entire frequency spectrum, each separated from the adjacent peak by the basic PRF. Thus, a peak within the fundamental PRF range, that is one obtained in the doppler filter output, does not necessarily place the doppler frequency at that value, but the true doppler frequency may be displaced from that value by any harmonic of the PRF. Doppler filter outputs obtained at two or more PRF's can be resolved into the true doppler frequency and hence into an unambiguous indication of true target velocity, as will be described.

A 2-out-of-5 binary integrator is employed to effect non-coherent integration gain with the multiple PRF's. A target detection is declared if it is detected on any 2 of the 5 PRF's. This detector architecture is well suited to AMTI usage because it automatically compensates for the fact that the target may be blind on one or more PRF's.

Tentative target reports from the coincidence gate cause the filter output number and the PRF number to be placed into temporary storage. When a target is detected by the binary integrator, the data sets are transferred to velocity decoding logic which accurately determines unambiguous target radial velocity.

The rationale, in part, for the selection of the 2-out-of-5 binary integrator is that any detected target must have been seen on at least 2 PRF's thereby permitting a velocity measurement to be made.

The velocity decoding logic consists of a filter number to band converter, and a velocity interval resolver. At each PRF, equal width velocity bands are assigned over the unambiguous doppler interval. The number of bands between PRF lines is directly related to the PRF ratio number: for example, the PRF whose ratio is 9 with respect to the others (7, 8, 10 and 11) has assigned 9 velocity bands.

The band converter logic first effects a band shift away from the 0 Hz reference using the first data set from the temporary storage unit. This shift is effected such that the target signal is aligned in the center of a band. The band number for this first data set is then assigned in accordance with the band in which the target falls.

Subsequent data sets are then drawn from temporary storage and assigned their respective band numbers, while using the same band shift value as was computed for the first set. Upon completion of all band number assignments, the data sets (two minimum, five maximum) are transferred to the velocity interval resolver, along with the value of the band shift.

The step involving the shift of the entire band structure is an essential ingredient of the velocity decoding concept. It recognizes that the decoding is a relative function, and does not have to be held to an absolute 0 Hz reference. As such, it assures that target detections are assigned to their correct bands on the respective PRF's. Without the shift, a target could be assigned to erroneous bands if the doppler frequency of the target was located near the edge of a band.

The velocity interval resolver decodes the previously ambiguous band numbers to produce an unambiguous band number. The Chinese Remainder Theorem affords a convenient means of directly computing the unambiguous band number. The band shift value is reapplied after computation of this band number. Thus, the velocity accuracy of the system is that of the doppler filters, rather than that of the velocity band width.

With the 2-out-of-5 binary integrator mechanization, the target is usually detected on more than just two PRF's. It can be shown that the 0.90 probability of detection criterion results in the target appearing on 3 or more PRF's about ⅔ of the time. This of course occurs more frequently for larger size (or closer range) targets. In this situation, velocity decoding can be performed using three or more PRF's, which results in unambiguous velocity measurement in excess of Mach 3.0. The importance of this is that nonsensical target reports (by virtue of their high apparent velocity), which are in actuality due to false alarm sources, can be identified as such and eliminated. Thus, the present invention further suppresses false alarms.

The multiple PRF concept as described thus provides a very effective detection and velocity measurement system. Its primary attributes are summarized below:
1. The use of five PRF's taken in the ratio of 7, 8, 9, 10 and 11 eliminate all blind speeds between ± Mach 3, thereby providing for uninterrupted velocity coverage. (Complete range coverage is assured by the choice of low frequency PRF's).
2. The band transformation (with shift) logic assures that all significant target velocity ambiguities are resolved, without errors caused by target signals being assigned to erroneous bands.
3. The 2-out-of-5 binary integration method assures that any detected target must have appeared on at least two PRF's, so that any detected target is assured of velocity measurement.
4. The blind speed elimination and velocity resolvement is accomplished while effecting non-coherent integration gain by virtue of the binary integrator.
5. Multiple time around echoes are automatically rejected by the 2-out-of-5 binary logic: signals originating from targets beyond the range of interest do not align in the same range gate on respective PRF's.
6. The mechanization of the processor is comparatively simple, using a basic FFT processor with binary integration logic. The velocity decoding logic acts only on target detection reports, and can be accommodated by software in a general purpose computer.

DRAWING DESCRIPTION

For a more complete understanding of the invention, reference may be had to the accompanying diagrams, in which;

FIG. 1 is a diagram illustrating certain characteristics of one embodiment of the invention, FIG. 2 is a composite of FIG. 1, FIG. 3 is a block diagram of a typical radar system using the present invention, FIG. 4 is a detail block diagram of a portion of FIG. 1, FIG. 5 is a physical representation of certain of the quantities involved, and FIG. 6 is a block diagram illustrating computer solution of the equations.

DETAILED DESCRIPTION

The theory of and apparatus for, processing of doppler radar signals to obtain target range and velocity are well documented in technical literature and in prior art patents. It has been taught that since pulsing is accomplished at a predetermined pulse repetition frequency, this gives rise to regions of blind speeds caused by main-lobe clutter rejection which recur at the pulse repetition frequency.

FIG. 1 shows the distribution of such blind speed regions as they would occur in a pulse radar system, versus the doppler frequency of the returned signal, for each of five different PRF's. Since the doppler frequency is determined by the target velocity and the wavelength of the transmitted signal the doppler scale can be replaced by, or converted to, a velocity scale. For purposes of this description, the velocity scale is shown in FIG. 1 as numbered velocity bands of equal width e.g. 40 Hz of doppler frequency. This translates to bands about 34 m. p. h. wide under conditions where Mach 1 is represented by doppler frequency of 860 Hz.

In the preferred embodiment, the radar system transmits five bursts of 16 pulses each in sequence, the PRF's of the bursts being in the ratio of 7:8:9:10:11 (although not necessarily in that order). The PRF's are preferably in the range generally known as low PRF (100–4000 Hz) in order to preserve long range detection capability. In FIG. 1 for example, the actual PRF's corresponding to the chosen ratios are 280, 320, 360, 400 and 440 Hz respectively. It should be noted that the ratios are preferably consecutive integers which have a minimum number of common divisors and of such value that the repetition frequency is at the lower end of the low PRF range.

The "blind speed" regions are illustrated in FIG. 1 by the shaded rectangles, such as regions 20, centered at multiples of 280 Hz, blind speed regions 21 centered at multiples of 320 Hz, and regions 22, 23 and 24 centered at multiples of 360, 400 and 440 Hz respectively. In these regions, target detection is not possible for that particular PRF. When the blind speeds at all PRF's are considered, at least two PRF's will always be clear for any target velocity, usually three, and sometimes four or five will be clear. The combined blind speeds are shown in FIG. 2 where the shaded area indicates the number of blind speeds which would occur in the five signals received for any target velocity. The least blind speeds occur where the ordinate of the hatched region is smallest (i.e. zero).

Target detection is possible whenever at least two PRF's are clear; thus, is seen from FIG. 2, all moving targets are detectable except for those that possess no significant radial velocity component (less than 34 m. p. h.)

The present invention comprises a novel processor for interpreting the signals in a multiple PRF radar system so as to provide completely unambiguous range and velocity indications.

Figure 3:
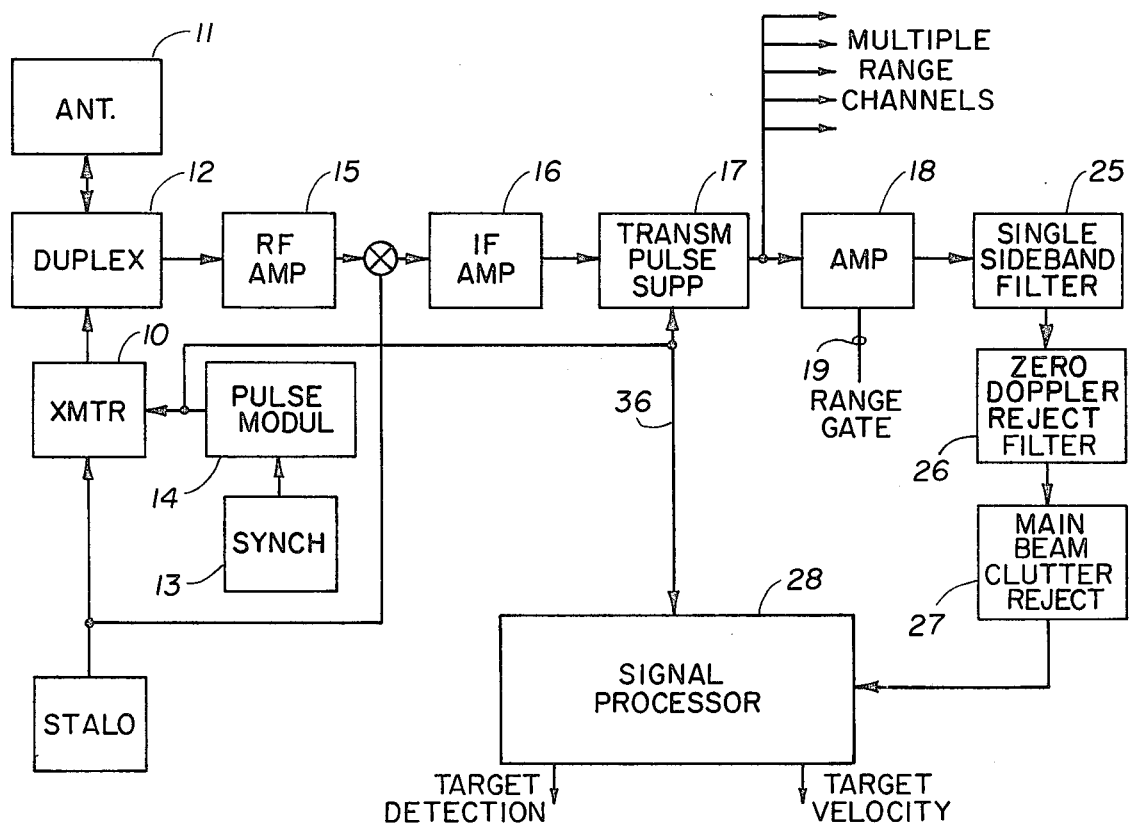
Figures 5, 6:
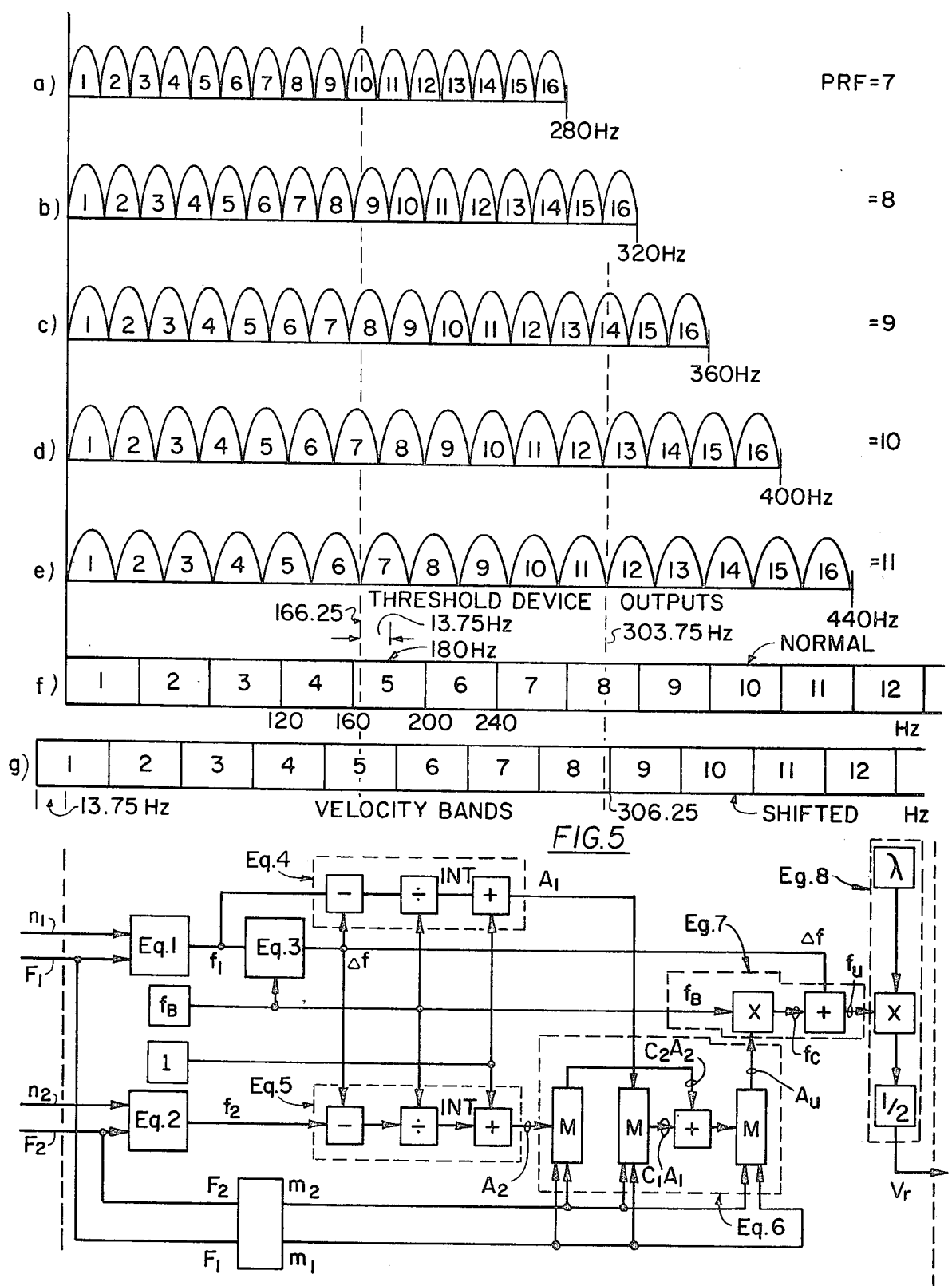

FIG. 3 shows the main components of a typical doppler radar system for airborne moving target indicators (AMTI's) in which the present invention may be employed, and is an adaptation of FIG. 6 on page 19-7 of the "Radar Handbook" edited by M. I. Skolnick, published by McGraw-Hill.

As shown in FIG. 3, the radar set includes a transmitter 10 which supplies the antenna 11, through duplexer 12, a series of pulses at the five different PRF's described. The transmitter 10 is controlled by a synch generator 13 and pulse modulator 14.

The received signal goes from the antenna 11 through an RF amplifier 15, IF amplifier 16, a transmitted pulse suppressor 17 to an amplifier 18, which is controlled by a range gate signal 19. Whatever follows the pulse suppressor 17 in FIG. 3, is replicated in each range gate for reasons well documented in prior art. The output of amplifier 18 is transmitted through single side band filter 25, zero doppler reject filter 26 and main beam clutter filter 27 to the signal processor 28, which encompasses the present invention, and in which the target velocity and the target detection signals are obtained.

Figure 4:
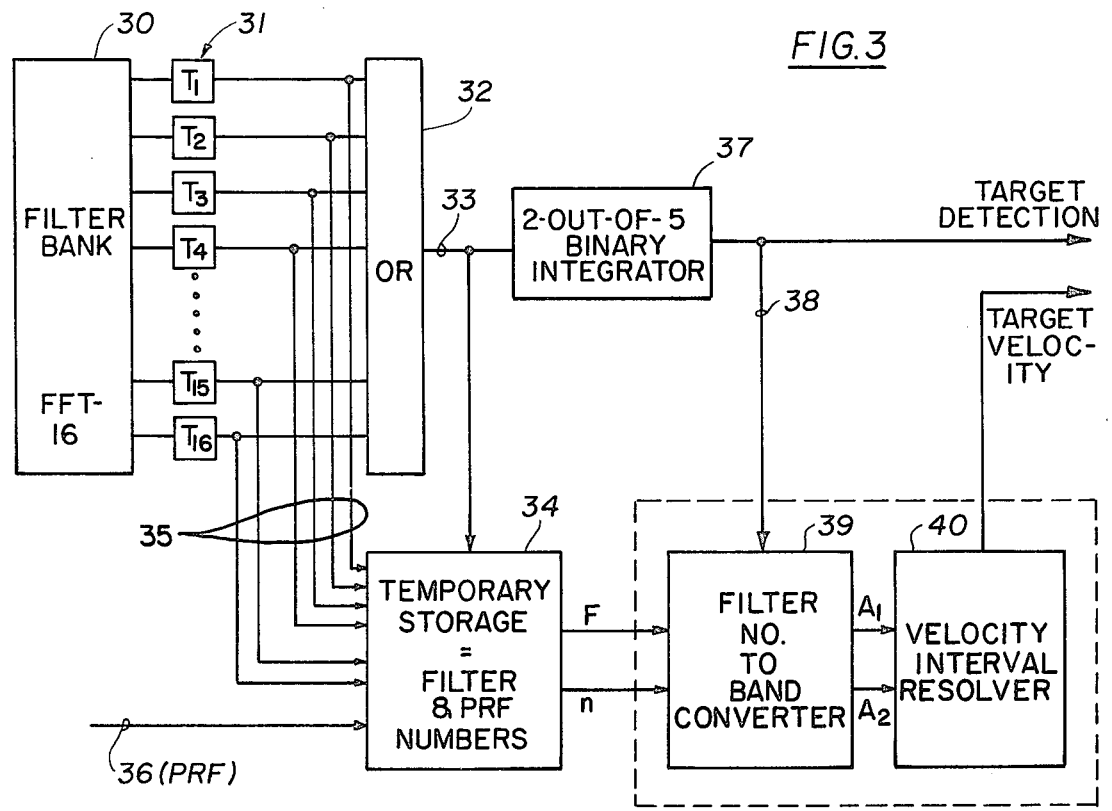

The signal processor 28 is shown in FIG. 4, wherein the signal from the main beam clutter reject filter 27 is applied to the filter bank 30. The main beam clutter reject filter is the source of blind speeds.

The digital filter bank 30 is of conventional design, such as a fast fourier transform filter, and produces "N" filter outputs once every "N" pulses at each PRF. (in the preferred embodiment a total of eighty pulses is available for all five PRF's, so that "N" is sixteen for each of five PRF's). In a system using multiple range gates, these outputs and subsequent processing occur within each and every range gate. Thus, the processor, of FIG. 4 is replicated for each range gate.

In the preferred embodiment, the filter bank 30 is a fast fourier transform filter producing sixteen outputs which are connected to the 16 threshold devices 31. It will be understood that the input to the filter is a signal comprised of 16 pulses which repeat at the PRF and whose frequency is the doppler frequency of the moving target. It will be further understood that the filter bank 30 is effectively a band pass filter in which the sixteen output bands cover the frequency spectrum from zero up to the particular pulse repetition frequency of the input signal. Thus, for a PRF of 280 Hz (ratio 7 in the embodiment being described) each filter band covers 280/16 or 17.5 Hz and for a PRF of 440 Hz (ratio 11) each filter bank covers 280/16 or 27.5 Hz. For each PRF between (ratios 8, 9, 10) the width of the filter band corresponds to 1/16 of the PRF. (See FIG. 5 curves a, b, c, d, e).

Now when a doppler frequency signal is received at the input to filter 30, a pulse will be produced at the output of one of the sixteen threshold devices, and the one at which it appears will identify the doppler frequency of the signal, within the limits of its sensitivity. For example, a pulse from the tenth threshold device 31 for a signal with a PRF of 280 will indicate that the doppler frequency lies between 157.5 and 175 Hz.

The threshold devices 31 are connected to an OR circuit 32 which produces a signal at its output line 33 whenever any one of the threshold devices 31 has an output. The line 33 is connected to a memory device 34, as are each of the threshold devices 31 through lines 35. The memory device 34 memorizes which threshold device produced an output and at which PRF the output was produced. For this reason the memory 34 is also provided with a PRF input, a signal from the transmitting circuit, e.g. from the synch generator on line 36.

The output 33 of the OR circuit 32 is also applied to the 2-out-of-5 binary integrator 37 which produces an output signal at line 38 whenever a target is detected at two or more different PRF's, thereby eliminating false target reports. The output of integrator 37 enables filter-to-number-to-band-converter 39 to accept the data sets from memory 34 and convert them to velocity bands, $A_1$ and $A_2$ for each true target indication. The $A_1$ and $A_2$ bands are resolved into a true and unambiguous velocity band in velocity interval resolver logic 40 and subsequently into true velocity, as will be described.

Consider first the mathematical conditions or relationships inherent in the operation of this invention.

As explained earlier, the doppler frequency scale is divided into velocity bands of equal value, e.g. 40 Hz, as shown in FIG. 1. Thus, in 280 Hz, there are 7 bands; in 320 Hz there are 8 bands, etc. For accuracy, correlation of the threshold device or filter number to the proper velocity band number, involves introduction of a band shift into the first data set to shift the center of the velocity band to the center of the filter, to thereby avoid uncertainty when the center of the filter is close to a limit of the band.

The equations governing the assignment of bands and band shift are derived as follows:

Let $n_1$ denote filter Number of first data set
$F_1$ denote PRF value of first data set
$n_2$ denote filter Number of second data set
$F_2$ denote PRF value of second data set
N denote the total number of filter bands in the doppler band filter i.e., 16 in the preferred embodiment.

Then the observed doppler frequency on each PRF is given by:

$$f_1 = \left( \frac{n_1 - 0.5}{N} \right) F_1, \text{ and} \tag{1}$$

$$f_2 = \left( \frac{n_2 - 0.5}{N} \right) F_2 \tag{2}$$

which corresponds to the center frequency of the filter in which detection occurred.

The velocity band in which detection occurs for the first data set must be shifted so that its center frequency coincides with the center frequency of the filter. The frequency shift can be expressed mathematically as:

$$\Delta f = (f_1 \text{ modulo } f_B) - f_B/2 \tag{3}$$

where
$\Delta f$ is the band shift value
$f_1$ is the center frequency of the filter
$f_B$ is the doppler frequency width of a velocity band, normally 40 Hz, and
$(f_1 \text{ modulo } f_B)$ is the remainder in $f_1/f_B$ The band number assignment can therefore be expressed mathematically as:

$$A_1 = 1 + \text{INT} \left[ \frac{f_1 - \Delta f}{f_B} \right] \tag{4}$$

$$A_2 = 1 + \text{INT} \left[ \frac{f_2 - \Delta f}{f_B} \right] \tag{5}$$

where INT indicates the Integer function of the quotient in brackets.

The physical representation of these quantities is seen in FIG. 5. Here assume that the radar system had indicated a target with a velocity in the 10th filter when the PRF is 280 (PRF ratio of 7). From equation (1)

$$f_1 = \frac{10 - .5}{16} F_1 = \frac{9.5}{16} \times 280 = 166.25 \text{ Hz}$$

$$(f_1 \text{ modulo } f_B) = (166.25 \text{ modulo } 40) = 6.25$$

$$\Delta f = 6.25 - \frac{f_B}{2} = 6.25 - 20 = -13.75 \text{ Hz}$$

This indicates that the velocity bands are all moved to the left by 13.75 Hz (FIG. 5(g)). The velocity band $A_1$ in which the target is detected is therefore:

$$A_1 = 1 + \text{INT}\left(\frac{166.25 - (-13.75)}{40}\right) = 1 + \text{INT}\left(\frac{180}{40}\right)$$
$$A_1 = 1 + 4 = 5$$

At a PRF of 360 (Ratio = 9) the same target will be detected in doppler filter number 14 and the corresponding values now became:

$$f_2 = \frac{14 - .5}{16}(360) = 13.5\frac{(360)}{16} = 303.75 \text{ Hz}$$

$\Delta f$ remains the same as for the first data set = $-13.75$ Hz $$A_2 = 1 + \text{INT}\left(\frac{303.75 - (-13.75)}{40}\right) = 1 + \text{INT}\frac{(317.50)}{40}$$
$$= 1 + 7 = 8$$

Since $A_1$ and $A_2$ are not the same velocity band they are known as ambiguous bands. It is understood that in radar receivers of the type herein employed, there exists a foldover characteristic whereby the target in a higher order velocity band would be indicated in each lower corresponding velocity band, repeating at the PRF interval. Thus, at a PRF of 280 Hz (Ratio 7) a target appearing in the fifth velocity band may actually represent a target in the 12th, 19th, 26th, 33rd, etc. velocity band. Similarly a target appearing in the 8th band at a PRF ratio 9, could be a target in any of bands 8, 17, 26, 35, and so on. It will be seen, by comparison, that the 26th band is common to both PRF 7 and 9 and is the unambiguous band for the condition given, i.e. $A_7 = 5$ and $A_9 = 8$. In order to resolve the ambiguity of $A_1$ and $A_2$ systematically, the Chinese Remainder Theorem is employed to find the single unambiguous band, Au, from the following expression:

$$\text{Au} = (C_1 A_1 + C_2 A_2) \text{ modulo } m_1 m_2 \quad (6)$$

where
$C_1 = b_1 m_2 = (1) \text{ modulo } (m_1)$
$C_2 = b_2 m_1 = (1) \text{ modulo } (m_2)$
where $m_1, m_2$ are the PRF ratios of the data sets, and $b_1$ is the smallest positive integer which, when multiplied by $m_2$ and divided by $m_1$, gives unity as the remainder (and similarly for $b_2$). For the preferred PRF ratios 7, 8, 9, 10, 11, of this application, there exist the following relationships:

| PRF's | Au |
|---|---|
| 7; 8 | $A_{7,8} = (8A_7 + 49 A_8)$ Modulo (56) |
| 7; 9 | $A_{7,9} = (36 A_7 + 28 A_9)$ Modulo (63) |
| 7; 10 | $A_{7,10} = (50 A_7 + 21 A_{10})$ Modulo (70) |
| 7; 11 | $A_{7,11} = (22 A_7 + 56 A_{11})$ Modulo (77) |
| 8; 9 | $A_{8,9} = (9 A_8 + 64 A_9)$ Modulo (72) |
| 8; 10 | $A_{8,10} = (50 A_8 + 32 A_{10})$ Modulo (80)/2 |
| 8; 11 | $A_{8,11} = (33 A_8 + 56 A_{11})$ Modulo (88) |
| 9; 10 | $A_{9,10} = (10 A_9 + 81 A_{10})$ Modulo (90) |
| 9; 11 | $A_{9,11} = (55 A_9 + 45 A_{11})$ Modulo (99) |
| 10; 11 | $A_{10,11} = (11 A_{10} + 100 A_{11})$ Modulo (110) |

Taking the second of the above equations, and substituting for $A_7$ and $A_9$ the ambiguous bands 5 and 8, as in the example shown earlier, the following result is obtained:
$A_{7,9}$
= (36 $A_7$ + 28 $A_9$) modulo 63
= (35 × 5 + 28 × 8) modulo 63
= (180 + 224) modulo 63
= (404) modulo 63
= 26 (the remainder after dividing 404 by 63)

Thus, the unambiguous band is calculated to be the 26th band, the same as found by the comparison above.

After the unambiguous velocity band, Au, has been found, the target doppler frequency, $f_u$, is determined to be the center frequency of that band, as modified by the $\Delta f$ value originally calculated for the first data set. Thus, $$f_u = (A_u - 0.5) f_B + \Delta f \quad (7)$$

or in the preferred embodiment, $$f_u = (A_u - 0.5) 40 + \Delta f$$

and in the example $f_u = (26 - 0.5) 40 + (-13.75) = 1006.25$ Hz

The target radial velocity, $V_r$, is then calculated from the unambiguous doppler frequency, $f_u$, in the usual fashion, e.g. according to the equation $$V_r = (\lambda \cdot f_u)/2 \quad (8)$$

wherein $\lambda$ is the radar wavelength.

It will be seen that by using the $\Delta f$ shift in the beginning and end as described above the accuracy of the system will be related to the width of the narrower doppler bands in filter 31 rather than the wider velocity bands and hence the velocity determination will be made with more precision.

After the data sets have been obtained and memorized in the temporary storage 34 these data are transmitted to a filter to band number converter 39 which performs the calculations described above in equations (1) through (5) to obtain $A_1$ and $A_2$.

The $A_1$ and $A_2$ data are then operated on according to equation (6), or in the preferred embodiment described according to the set of ten equations, to obtain Au in the resolver 40. Resolver 40 also determines the velocity by equation (8). Both converter 39 and resolver 40 preferably comprise a computer whose design is well within the state-of-the-art.

Instrumentation of the equations 1–6 is a matter of choice for the designer, but is preferably accomplished in an airborne computer already on the aircraft. A particular computer could be one identified by the Department of Defense as ASQ-155 and typified by the IBM 4 Pi computer. The preparation of software for solution of the equations is well within the capabilities of a programmer familiar with the particular computer's requirements. Basically, the computer would perform the operations described in connection with FIG. 5.

As shown in FIG. 6, the computer would use the filter numbers, $n_1$ and $n_2$ and the PRF values $F_1$ and $F_2$ of the first two data sets and Equations 1 and 2 to determine $f_1$ and $f_2$. $\Delta f$ is calculated from $f_1$ and $f_B$ by Equation 3 and the result is subtracted from $f_1$ and $f_2$. The differences are divided by $f_B$ and the integers of the quotients are added to unity to obtain the $A_1$ and $A_2$ ambiguous velocity bands, according to equations 4 and 5.

The $A_1$ and $A_2$ values so determined and the PRF ratios are used to solve equation 6, or to select the unambiguous band Au from a memory which contains the solution for all possible ambiguous velocity band combination as predetermined from the family of the ten "Chinese Remainder" equations (6a). The doppler frequency, fc, at the center of the unambiguous band is determined, preferably as part of the memorized solution, since only a constant multiplier, $f_B$, is involved. The $\Delta f$ shift initially applied to $f_1$ is reapplied to the $fc$ (in the opposite direction) to obtain $fu$, an indication of the actual doppler frequency of the echo returned from the target. The $fu$ value is converted to target radial velocity according to the equation (8) $V_r = (\lambda \cdot fu)/2$.

While the invention has been described with reference to the preferred embodiment, there are many alternative and additional features which could be incorporated by those skilled in the art without departing from the spirit of the invention. Such features might include the following:

A. Transmission and reception of each PRF pulse burst at a different carrier frequency, commonly known in the art as frequency agility to enhance target reflective properties, wherein small adjustments of the actual PRF values are effected in accordance with the carrier frequency values, to effect the velocity scales in the same predetermined ratio, preferably that of 7, 8, 9, 10, and 11.

B. Logic incorporating the result that a target is visible on two or more of the five PRF's in order to enhance radar detection performance and false alarm suppression, said logic encompassing any means of non-coherent or coherent integration, of which a binary integrator is one embodiment.

C. Logic rendering a more accurate and precise indication of unambiguous target radial velocity. Such logic, comparing the signal strength of the target in adjacent filters to interpolate a more accurate measure of target radial velocity, is analogous to early/late range gates used in some tracking radars to effect a more precise determination of target range than is afforded by the basic range resolution of the tracking radar.

D. Range bin compensation logic, used in conjunction with the described multiple PRF processor system in applications where a target might migrate through successive range bins during the course of the multiple PRF pulse transmissions, accounting for the change in range to the target during this time, and logic that compares the measured velocity with the apparent rate associated with range bin migration to confirm the velocity measurements.

E. Analogous applications involving Sonar, wherein the same laws of waveform and propagation apply, with known adjustments made to the particular values.

Thus, the invention is not to be limited by the description of the prepared embodiment herein but is rather to be defined by the scope of the appended claims.

I claim:

1. In a doppler pulse echo system for determining the velocity of a target of the type including a transmitter for transmitting a series of energy pulses toward said target at a predetermined pulse repetition frequency (PRF), means for modifying said pulse repetition frequency at predetermined intervals, a signal processing device for processing the echo signal returned by said target to determine the doppler frequency representative of velocity of said target, the doppler frequency spectrum comprising a plurality of velocity bands of predetermined frequency width, said processing device comprising:

a doppler filter bank including a plurality of filter circuits each filter circuit responsive to a predetermined band of frequencies at each PRF, a plurality of signal threshold devices, each connected to a different one of said filter circuits, means for applying a signal derived from said echo return to said filter bank, memory means for storing data sets comprising the identities of the specific threshold device producing an output signal and the PRF of the transmitted signal at which said threshold output is produced, means for converting the first data set at one PRF to one of said velocity bands, means for converting another data set at a different PRF to one of said velocity bands, means for determining from said velocity bands a single unambiguous velocity band which satisfies each of said data sets, means for determining the target velocity according to the doppler frequency represented by said unambiguous velocity band.

2. The device of claim 1 including:

means for shifting the origin of said velocity bands so as to align the center frequency of said one velocity band with the center frequency of the filter circuit connected to said identified threshold device, means for applying the frequency shift of the origin of the velocity bands to the center frequency of said unambiguous velocity band to obtain said doppler frequency of said target.

3. The device of claim 1 wherein the PRF frequencies are in the ratio of 7:8:9:10:11.

4. The device of claim 1 including a logic OR circuit having a plurality of inputs, said threshold devices connected to said OR circuit inputs, a binary integrator connected to the output of said OR circuit, the output of said OR circuit connected to said memory means to enable said means, and, the output of said binary integrator being connected to said means for correlating the data sets with the velocity bands to enable said correlating means.

5. The method of claim 12 wherein said step of converting data sets into velocity bands is characterized by the relationships:

$$A_x = 1 + \text{INT} \left( \frac{f_x - \Delta f}{f_B} \right)$$

where subscript $x$ identifies the data sets (1 or 2)
$A_x$ = the velocity band
INT = the integer of the expression in parenthesis $$f_x = \left( \frac{n_x - 0.5}{N} \right) F_x$$

$$\Delta f = (f_x \text{ modulo } f_B) - \frac{f_B}{2}$$

$n_x$ = the filter output number
N is the total number of filters in said filter bank,
$F_x$ is the pulse repetition frequency, and
$f_B$ is the frequency width of a velocity band.

6. The method of claim 5 wherein said single unambiguous velocity band is characterized by the relationship $A_u = (C_1 A_1 + C_2 A_2)$ modulo $(m_1 m_2)$ where
$C_1 = b_1 m_2$ and $b_1 m_2 = (1)$ (modulo $m_1$)
$C_2 = b_2 m_1$ and $b_2 m_1 = (1)$ (modulo $m_2$)
$m_1 m_2$ = PRF ratios of the data sets, and
$b_1 b_2$ = smallest integers which satisfy the equations.

7. In a multi PRF doppler radar system for determining the velocity of a target including means for controlling the PRF and modifying the PRF at predetermined intervals, a return signal processor comprising:
- a doppler filter bank connected to said return signal and providing a signal at one of said filters in said bank,
- a temporary storage device connected to said filter bank and to said PRF controlling means for storing data sets comprising the said one filter number and the corresponding PRF for at least two different PRF values,
- means for converting any two data sets in said storage device into a first velocity indication and second velocity indication,
- means for resolving said first and second velocity indications into a single unambiguous velocity indication of said target velocity.

8. The device in claim 7 wherein said multi PRF values are in the ratio of 7:8:9:10:11

9. In a doppler pulse echo system for determining the velocity of a target of the type including a transmitter for transmitting a series of energy pulses toward said target at a predetermined pulse repetition frequency (PRF), a receiver for receiving a pulse echo signal reflected by said target and a signal processing device having a doppler filter bank including a plurality of filter circuits, the method for determining the doppler frequency representative of the target velocity including the steps of:

- separating the doppler spectrum into a plurality of velocity bands of predetermined frequency width,
- modifying the PRF at predetermined intervals according to a predetermined pattern of at least three different PRF ratios,
- storing data sets comprising the identities of the specific filter circuit which produces an output signal and the PRF ratio of the transmitted signal at which said output signal is produced,
- converting the first data set at one PRF to one of said velocity bands, converting another data set at a different PRF to one of said velocity bands, determining from said velocity bands a single unambiguous velocity band which satisfies each of said data sets, and
- determining the target velocity according to the doppler frequency represented by said unambiguous velocity band.

10. The method of claim 9 including the steps of:
- shifting the origin of said velocity bands so as to align the center frequency of said one velocity band with the center frequency of the filter circuit producing said first data set, and
- applying the frequency shift of the origin of the velocity bands to the center frequency of said unambiguous velocity band to obtain said doppler frequency of said target.

11. The method of claim 9 wherein the PRF frequencies are modified in the ratios of 7:8:9:10:11.

* * * * *

UNITED STATES PATENT AND TRADEMARK OFFICE
CERTIFICATE OF CORRECTION

PATENT NO. : 4,057,800
DATED : November 8, 1977
INVENTOR(S) : Frederick M. Ganz

It is certified that error appears in the above-identified patent and that said Letters Patent are hereby corrected as shown below:

In claim 5, column 10, line 39, the reference numeral "12" should read ---10---.

Signed and Sealed this

Seventh Day of March 1978

[SEAL]

Attest:

RUTH C. MASON
Attesting Officer

LUTRELLE F. PARKER
Acting Commissioner of Patents and Trademarks